US005494393A

United States Patent [19]
Schrunk

[11] Patent Number: 5,494,393
[45] Date of Patent: Feb. 27, 1996

[54] TRUCK-MOUNTED, VEHICLE CARRIER APPARATUS

[76] Inventor: Cas A. Schrunk, P.O. Box 86, Hines, Oreg. 97738

[21] Appl. No.: 405,364

[22] Filed: Mar. 16, 1995

[51] Int. Cl.⁶ .................................................. B65G 67/02
[52] U.S. Cl. ............................................ 414/537; 14/69.5
[58] Field of Search .................................. 414/537, 538, 414/462; 14/69.5, 71.1

[56] References Cited

U.S. PATENT DOCUMENTS

| | | | |
|---|---|---|---|
| 299,746 | 6/1884 | Coppes | 414/537 |
| 3,510,015 | 5/1970 | Roshaven | 414/537 |
| 3,613,920 | 10/1971 | Flamm | 414/537 |
| 3,642,156 | 2/1972 | Stenson | 414/537 |
| 3,757,972 | 9/1973 | Martin | 414/537 |
| 3,870,170 | 3/1975 | Noble et al. | 414/537 |
| 3,976,209 | 8/1976 | Burton | 414/537 |
| 4,171,844 | 10/1979 | Landaal et al. | 296/57.1 |
| 4,601,652 | 7/1986 | Agee | 414/537 |
| 4,624,619 | 11/1986 | Uher | 414/537 |
| 4,874,284 | 10/1989 | New, Jr. | 414/537 |
| 5,077,852 | 1/1992 | Karlsson | 414/537 |
| 5,137,114 | 8/1992 | Yde et al. | 14/71.1 X |
| 5,244,335 | 9/1993 | Johns | 414/537 |
| 5,281,075 | 1/1994 | Tatman et al. | 414/537 X |
| 5,287,579 | 2/1994 | Estevez, Jr. | 414/537 X |
| 5,306,113 | 4/1994 | Mann | 414/537 |

Primary Examiner—David A. Bucci

[57] ABSTRACT

A vehicle carrier apparatus, that is adapted to be mounted on a first side wall and a second side wall of a transporter vehicle, includes a framework assembly that is screw clamped onto the side walls. The framework assembly has riser assemblies which support a transported-vehicle support assembly. A fence assembly may be connected to one side of the framework assembly. A retractable ramp assembly is supported by the framework assembly between the transported-vehicle support assembly and the side walls of the transported vehicle. The retractable ramp assembly includes a first ramp portion supported by the framework assembly and includes a second ramp portion supported by the first ramp portion. Both the first ramp portion and the second ramp portion are adapted to be slid horizontally away from the framework assembly. The first ramp portion is adapted to pivot for downward movement from the framework assembly, and the second ramp portion is adapted to be selectively extended away from or retracted toward the first ramp portion. By using a pair of vehicle carrier apparatuses, when the retractable ramp assembly of each vehicle carrier apparatus is extended away from the respective framework assembly, and when the distal end of the respective second ramp portion of the respective retractable ramp assembly contacts the ground, a small four-wheeled vehicle can be rolled up the pair of extended retractable ramp assemblies onto the pair of transported-vehicle support assemblies.

18 Claims, 6 Drawing Sheets

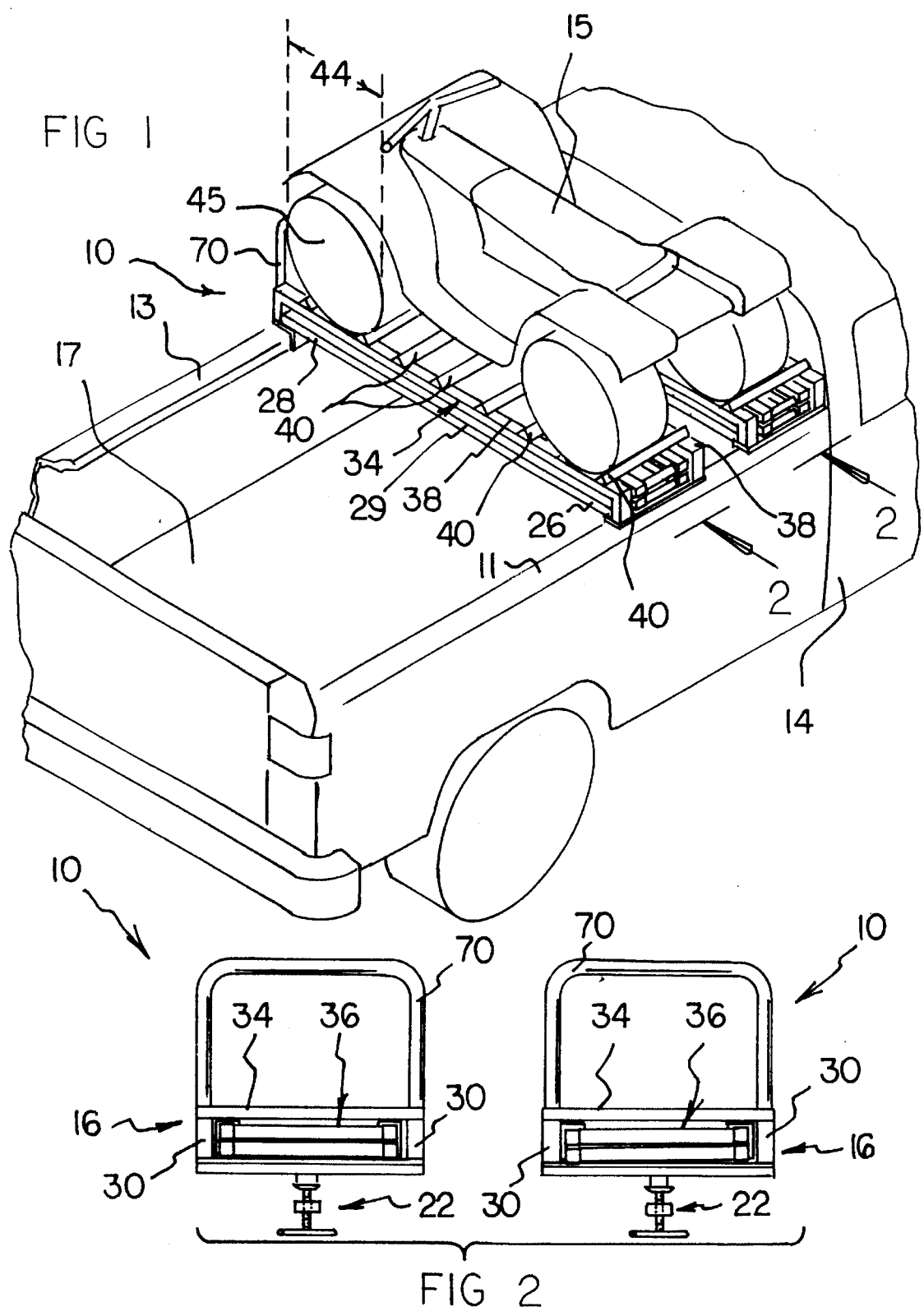

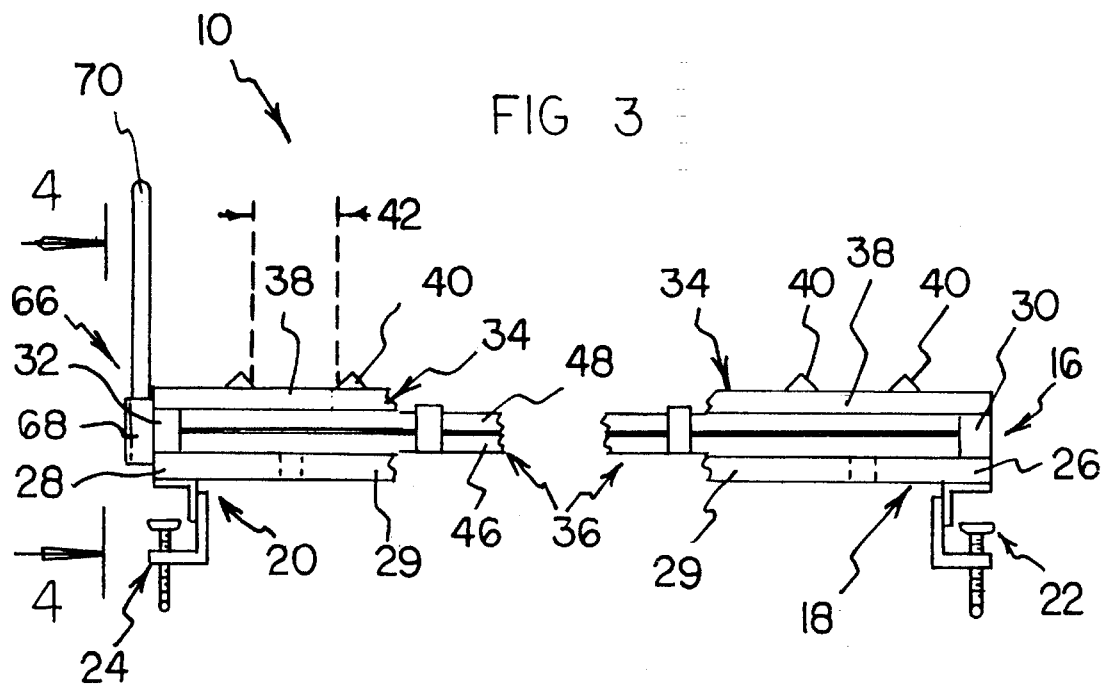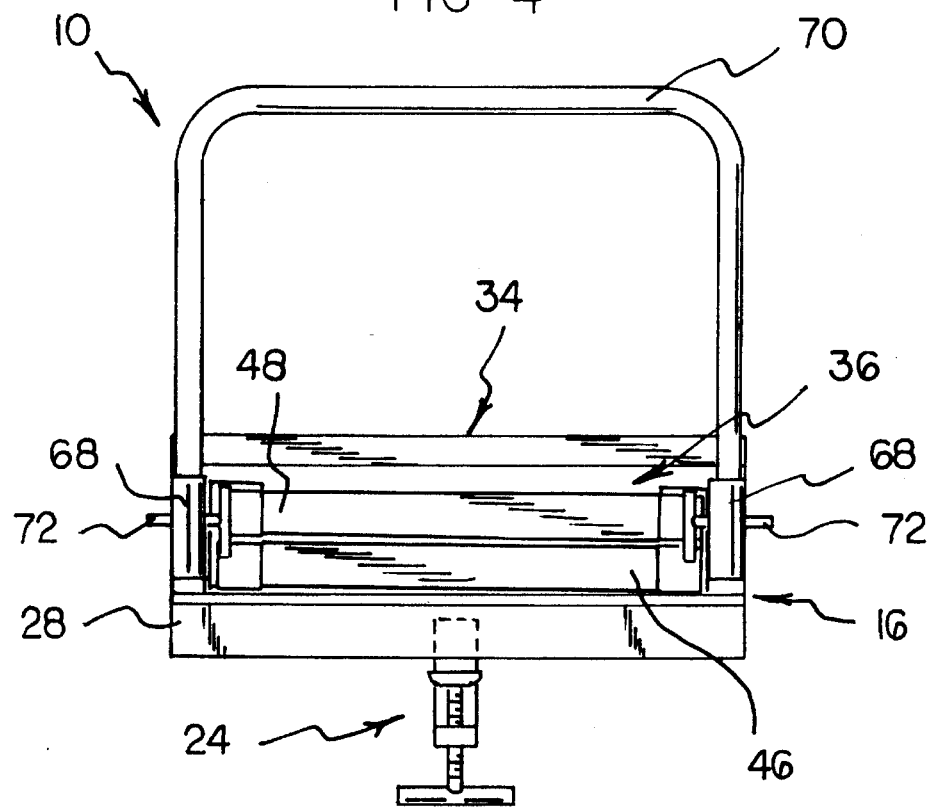

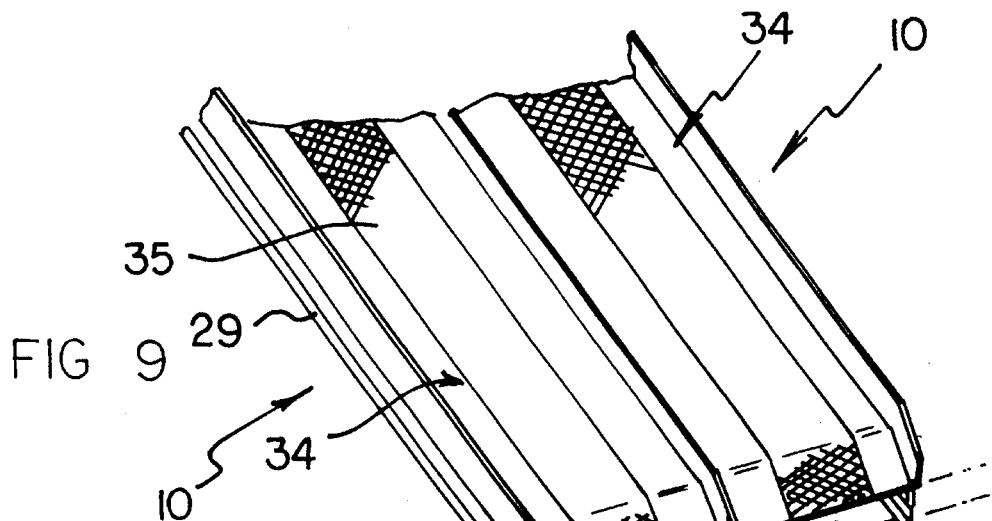
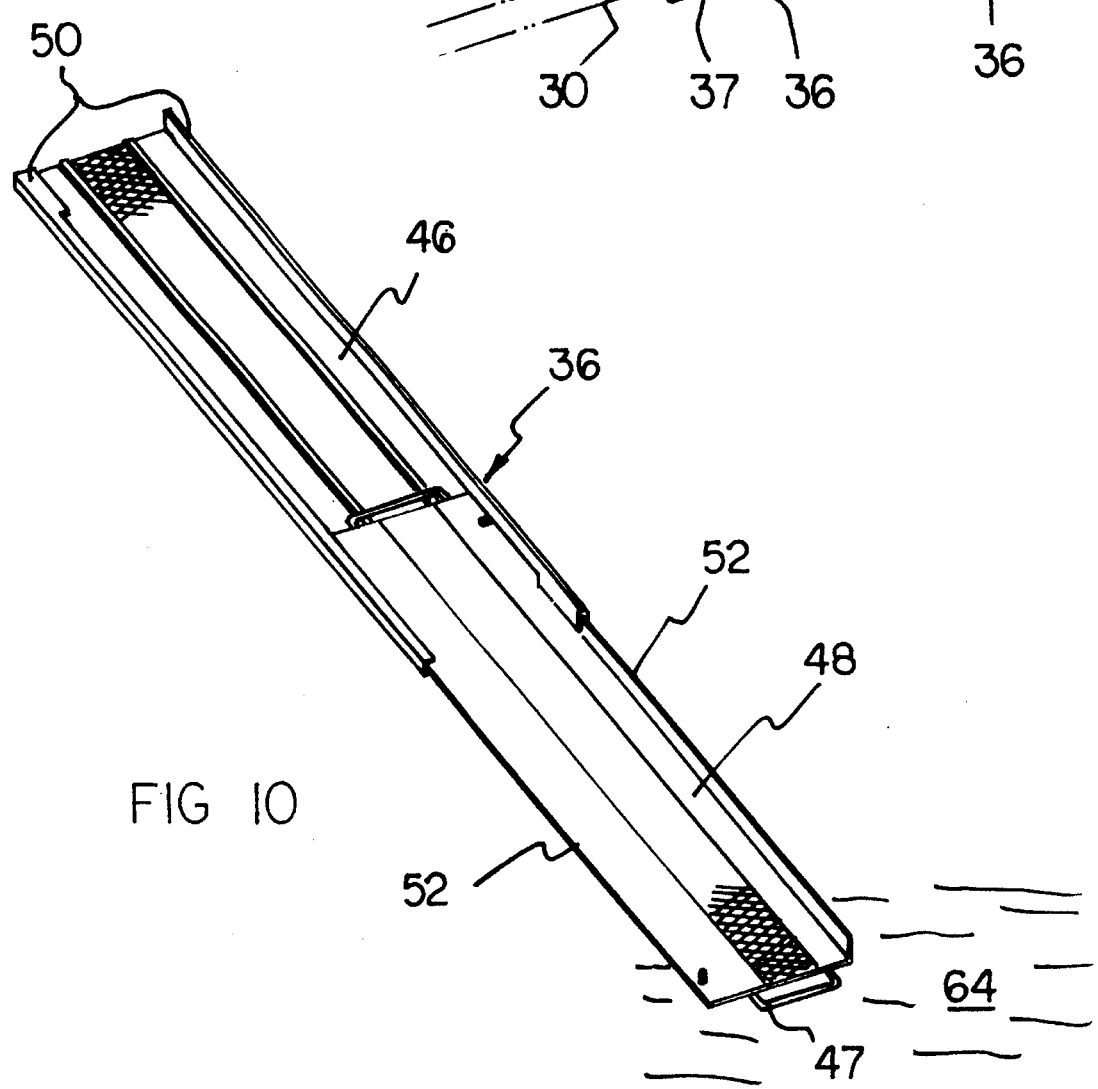

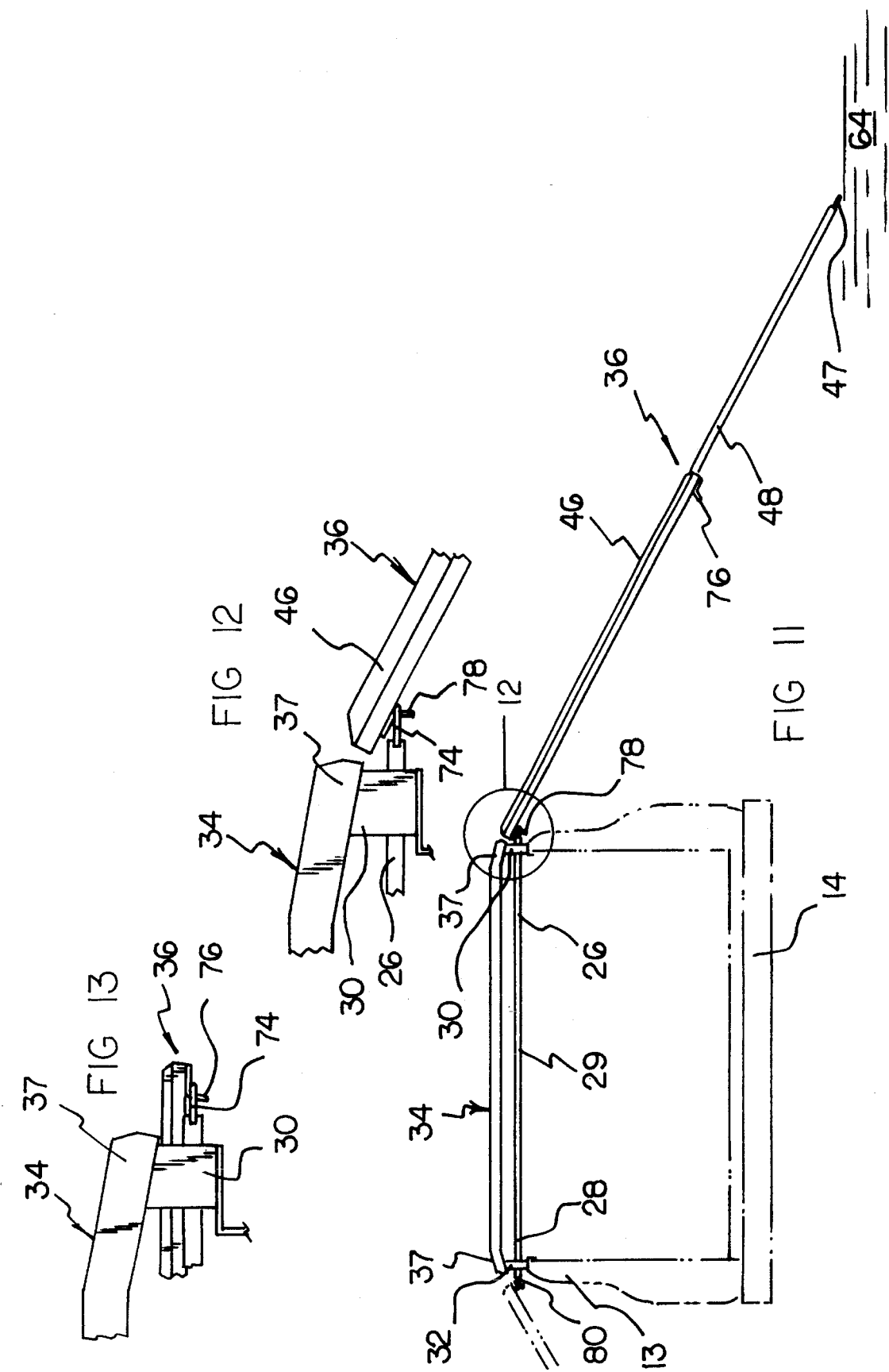

TRUCK-MOUNTED, VEHICLE CARRIER APPARATUS

BACKGROUND OF THE INVENTION

1. Field of the Invention

The present invention relates generally to vehicle carriers and, more particularly, to devices especially adapted for carrying vehicles on trucks.

2. Description of the Prior Art

Certain vehicles are relatively small and are often transported by other vehicles to different locations. For example, all terrain vehicles (ATVs), motorcycles, and bicycles are often transported on trailers pulled by passenger automobiles or trucks. In addition, the above-mentioned small vehicle, are often transported on the beds of pickup trucks. Conventionally, the small vehicles are rolled onto the bed of a trailer or pickup truck using a ramp assembly.

More specifically, throughout the years, a number of innovations have been developed relating to devices adapted for loading or carrying small vehicles onto the beds of pickup trucks, and the following U.S. patents are representative of some of those innovations: U.S. Pat. Nos. 3,642,156; 3,870,170; 3,976,209; 4,171,844; 4,624,619; and 5,287,579. All of the devices disclosed in the above-cited patents have a number of common characteristics. First, the small vehicle is loaded and unloaded from the pickup truck by way of a lowered tailgate. Second, the small vehicle rests upon the bed of the pickup truck as the small vehicle is transported.

A number of disadvantages are associated with the need to load and unload a small vehicle by way of a lowered tailgate. For example, a ramp assembly must be provided that is specifically adapted to work in conjunction with a tailgate. There are a wide variety of tailgates, and providing a substantially universal ramp assembly for a variety of tailgates may not be possible. When a small vehicle is loaded onto the bed of the pickup truck, the small vehicle is usually rolled in a forward motion, and steering is best controlled when the small vehicle rolls forward. However, when the small vehicle is unloaded from the pickup truck, the small vehicle must be backed out of the pickup truck. Yet steering of the small vehicle is less easily controlled when the vehicle is moved backward. In this respect, it would be desirable if a device were provided for carrying a small vehicle on a transporter vehicle that does not require the carried vehicle to be backed off of the transporter vehicle.

In a pickup truck, the tailgate is generally located along the longitudinal axis of the truck. As a result, a vehicle to be carried by the pickup truck must be loaded and unloaded along the longitudinal axis of the truck. However, there may be circumstances wherein loading and unloading of a small vehicle along the longitudinal axis of a pickup truck may be inconvenient. In this respect, it would be desirable if a device were provided for carrying a small vehicle on a transporter vehicle wherein the small vehicle need not be loaded and unloaded along the longitudinal axis of the transporter vehicle.

Still other features would be desirable in a truck-mounted or trailer-mounted vehicle carrier apparatus. For example, a pickup truck and an open-top trailer generally have a bed and walls adjacent to the bed. The amount of bed space is limited. Therefore, when a small vehicle is carried on the bed, space that would otherwise be available on the bed is occupied by the small vehicle. To avoid occupying truck or trailer bed space, it would be desirable if a carrier for a small vehicle were provided which does not occupy bed space in a truck or trailer.

Many trucks and trailers have beds which are not enclosed and, therefore, unprotected from rain, snow, and the like. Objects which are exposed to rain and snow have a tendency to undergo rust and other forms of deterioration due to the presence of accumulated water. In this respect, it would be desirable if a device were provided for carrying small vehicles on a truck or trailer that readily drained water to prevent water accumulation.

Thus, while the foregoing body of prior art indicates it to be well known to use transporter vehicles for carrying small vehicles, the prior art described above does not teach or suggest a truck-mounted, vehicle carrier apparatus which has the following combination of desirable features: (1) avoids the need to load and unload a small vehicle by way of a lowered tailgate; (2) is not specifically adapted to work in conjunction with a tailgate; (3) does not require a carried vehicle to be backed off of the transporter vehicle; (4) carries a small vehicle on a transporter vehicle in such a way that the small vehicle need not be loaded and unloaded along the longitudinal axis of the transporter vehicle; (5) readily drains water to prevent water accumulation; and (6) does not occupy bed space in a truck or trailer. The foregoing desired characteristics are provided by the unique truck-mounted, vehicle carrier apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a vehicle carrier apparatus that is adapted to be mounted on a first side wall and a second side wall of a transporter vehicle. The vehicle carrier apparatus includes a framework assembly which includes a first end portion and a second end portion. The framework assembly includes a first base portion located at the first end portion and a second base portion located at the second end portion. A first clamp assembly is attached to the first base portion of the framework assembly, and the first clamp assembly is adapted to clamp onto the first side wall of the transporter vehicle. A second clamp assembly is attached to the second base portion of the framework assembly, and the second clamp assembly is adapted to clamp onto the second side wall of the transporter vehicle.

A first riser assembly is connected to the first base portion of the framework assembly such that the first riser assembly is supported by the first side wall of the transporter vehicle. A second riser assembly is connected to the second base portion of the framework assembly such that the second riser assembly is supported by the second side wall of the transporter vehicle. A transported-vehicle support assembly is supported by the first riser assembly and the second riser assembly. A retractable ramp assembly is supported by the framework assembly in a location in the framework assembly above the first base portion and the second base portion and below the transported-vehicle support assembly. The first base portion and the second base portion of the framework assembly are connected together with a strut portion. The first base portion, the second base portion, and the strut portion are formed as a unitary integrated structure. The first clamp assembly and the second clamp assembly are screw clamp assemblies.

The transported-vehicle support assembly includes a pair of transverse members supported by the first riser assembly and the second riser assembly, and a plurality of longitudinal cross members connected between the transverse members. The cross members are spaced apart from one another transversely along the transverse members by a transverse distance.

A fence assembly is connected to the framework assembly. The fence assembly includes a pair of fence supports connected to a pair of second riser assemblies of the framework assembly. A fence member is connected to the fence supports.

The retractable ramp assembly includes a first ramp portion supported by the first base portion and the second base portion and includes a second ramp portion supported by the first ramp portion. Both the first ramp portion and the second ramp portion are adapted to be slid horizontally away from the second base portion of the framework assembly. The first ramp portion is adapted to pivot for downward movement from the first base portion of the framework assembly, and the second ramp portion is adapted to be selectively extended away from or retracted toward the first ramp portion. The first ramp portion includes a plurality of guide members which contact and guide the second ramp portion when the second ramp portion is moved longitudinally with respect to the first ramp portion. The first ramp portion includes a pair of transverse members and a plurality of longitudinal cross members which are connected across the transverse members. The second ramp portion includes a pair of transverse members and a plurality of longitudinal cross members which are connected across the transverse members. The first ramp portion includes a pair of channels, and the second ramp portion includes a pair of flanges which are slidingly received in the channels.

The transported-vehicle support assembly includes a platform member. The platform member includes a ramp end portion located at each end of the platform member.

The first base portion of the framework assembly includes a first eye assembly. The first ramp portion of the retractable ramp assembly includes a first hook assembly located at a first end of the first ramp portion and a second hook assembly located at a second end of the first ramp portion. The second base portion of the framework assembly includes a second eye assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck-mounted, vehicle carrier apparatus which has all of the advantages of the prior art and none of the disadvantages.

It is another object of the present invention to provide a new and improved truck-mounted, vehicle carrier apparatus which may be easily and efficiently manufactured and marketed.

It is a further object of the present invention to provide a new and improved truck-mounted, vehicle carrier apparatus which is of durable and reliable construction.

An even further object of the present invention is to provide a new and improved truck-mounted, vehicle carrier apparatus which is susceptible of a low cost of manufacture with regard to both materials and labor, and which accordingly is then susceptible of low prices of sale to the consuming public, thereby making such truck-mounted, vehicle carrier apparatus available to the buying public.

Still yet a further object of the present invention is to provide a new and improved truck-mounted, vehicle carrier apparatus which avoids the need to load and unload a small vehicle by way of a lowered tailgate on a pickup track.

Still another object of the present invention is to provide a new and improved truck-mounted, vehicle carrier apparatus that is not specifically adapted to work in conjunction with a tailgate.

Yet another object of the present invention is to provide a new and improved truck-mounted, vehicle carrier apparatus which does not require a carried vehicle to be backed off of the transporter vehicle.

Even another object of the present invention is to provide a new and improved truck-mounted, vehicle carrier apparatus that carries a small vehicle on a transporter vehicle in such a way that the small vehicle need not be loaded and unloaded along the longitudinal axis of the transporter vehicle.

Still a further object of the present invention is to provide a new and improved truck-mounted, vehicle carrier apparatus which readily drains water to prevent water accumulation.

Yet another object of the present invention is to provide a new and improved truck-mounted, vehicle carrier apparatus that does not occupy bed space in a truck or trailer.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a pair of first embodiments of the truck-mounted, vehicle carrier apparatus of the invention mounted on side walls of a pickup truck and carrying a four-wheeled all terrain vehicle.

FIG. 2 is an enlarged side view of the pair of embodiments of the invention shown in FIG. 1 taken along line 2—2 of FIG. 1 with the all terrain vehicle removed and with the pickup truck side walls removed.

FIG. 3 is a rear view of the left embodiment of the invention shown in FIG. 2.

FIG. 4 is an enlarged side view of the embodiment of the invention shown in FIG. 3 taken along line 4—4 of FIG. 3.

FIG. 9 a partial perspective view of a pair of second embodiments of the truck-mounted, vehicle carrier apparatus of the invention mounted on a side walls of a pickup truck.

FIG. 10 is a perspective view of one of the ramp assemblies of the pair of second embodiments of the invention, wherein the ramp assembly is extended to contact the ground.

FIG. 11 is a rear view of the rearmost embodiment of the pair of second embodiments of the invention shown in FIG. 9 showing the rearmost embodiment mounted on the side walls of a pickup truck and showing a ramp assembly fully extended from the embodiment and contacting the ground.

FIG. 12 is an enlarged view of the portion of the embodiment of the invention shown in FIG. 11 that is enclosed in the circled area 12 of FIG. 11.

FIG. 13 is a view of the portion of the embodiment of the invention shown in FIG. 12 with the ramp assembly having been retracted from the ground and returned to a stored position within the framework of the invention.

DESCRIPTION OF THE PREFERRED EMBODIMENT

Figure 5:
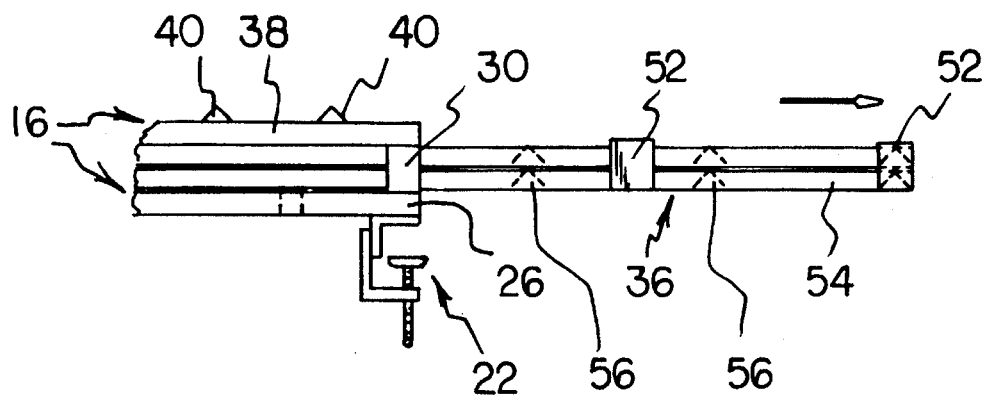
FIG. 5 is a partial rear view of the embodiment of the invention shown in FIG. 3 with a ramp assembly moved horizontally out of the framework of the apparatus.

With reference to the drawings, a new and improved truck-mounted, vehicle carrier apparatus embodying the principles and concepts of the present invention will be described.

Turning to FIGS. 1–8, there is shown a first embodiment of the truck-mounted, vehicle carrier apparatus of the invention generally designated by reference numeral 10. In its preferred form, the truck-mounted, vehicle carrier apparatus 10 is adapted to be mounted on a first side wall 11 and a second side wall 13 of a transporter vehicle 14. The vehicle carrier apparatus 10 includes a framework assembly 16 which includes a first end portion 18 and a second end portion 20. The framework assembly 16 includes a first base portion 26 located at the first end portion 18 and a second base portion 28 located at the second end portion 20. A first clamp assembly 22 is attached to the first base portion 26 of the framework assembly 16, and the first clamp assembly 22 is adapted to clamp onto the first side wall 11 of the transporter vehicle 14. A second clamp assembly 24 is attached to the second base portion 28 of the framework assembly 16, and the second clamp assembly 24 is adapted to clamp onto the second side wall 13 of the transporter vehicle 14.

A first riser assembly 30 is connected to the first base portion 26 of the framework assembly 16 such that the first riser assembly 30 is supported by the first side wall 11 of the transporter vehicle 14. A second riser assembly 32 is connected to the second base portion 28 of the framework assembly 16 such that the second riser assembly 32 is supported by the second side wall 13 of the transporter vehicle 14. A transported-vehicle support assembly 34 is supported by the first riser assembly 30 and the second riser assembly 32. A retractable ramp assembly 36 is supported by the framework assembly 16 in a location in the framework assembly 16 above the first base portion 26 and the second base portion 28 and below the transported-vehicle support assembly 34. The first base portion 26 and the second base portion 28 of the framework assembly 16 are connected together with a strut portion 29. The first base portion 26, the second base portion 28, and the strut portion 29 are formed as a unitary integrated structure. The first clamp assembly 22 and the second damp assembly 24 are screw clamp assemblies.

The transported-vehicle support assembly 34 includes a pair of transverse members 38 supported by the first riser assembly 30 and the second riser assembly 32, and a plurality of longitudinal cross members 40 connected between the transverse members 38. The cross members 40 are spaced apart from one another transversely along the transverse members 38 by a transverse distance 42. The transverse distance 42 is less than a diameter 44 of a wheel 45 of a small vehicle such as the all terrain vehicle 15 shown in FIG. 1. In this way, sequential cross members 40 support a wheel 45, and all four wheels 45 of the all terrain vehicle 15 are supported in the same way, on sequential cross members 40 as shown in FIG. 1. In addition, it is clear from FIG. 1 that when the all terrain vehicle 15 is transported, the bed 17 of the transporter vehicle 14 is not occupied by the all terrain vehicle 15. Therefore, even when the all terrain vehicle 15 is being transported, the bed 17 of the transporter vehicle 14 has its full capacity available for carrying other items.

With the vehicle carrier apparatus 10 of the invention being installed on the first side wall 11 and the second side wall 13, the vehicle carrier apparatus 10 of the invention is oriented perpendicularly to the longitudinal axis of the transporter vehicle 14.

A fence assembly 66 is connected to the framework assembly 16. The fence assembly 66 includes a pair of fence supports 68 connected to a pair of second riser assemblies 32 of the framework assembly 16. A fence member 70 is connected to the fence supports 68. The fence supports 68 includes sockets for receiving ends of the fence member 70. The fence member 70 can be pulled out of the sockets of the fence supports 68 when the all terrain vehicle 15 is loaded onto or unloaded from the transported-vehicle support assembly 34. When the fence member 70 is placed in the fence supports 68, the fence assembly 66 serves to prevent the all terrain vehicle 15 from rolling off of the transported-vehicle support assembly 34. Locking pins 72 are used to retain the fence member 70 in the fence supports 68. A chain or other type of securement device can be used to secure the all terrain vehicle 15 to the fence member 70. Similarly, a chain or other securement device can be used to secure the all terrain vehicle 15 to the transported-vehicle support assembly 34.

The retractable ramp assembly 36 includes a first ramp portion 46 supported by the first base portion 26 and the second base portion 28 and includes a second ramp portion 48 supported by the first ramp portion 46. As shown in FIG. 10, the second ramp portion 48 includes a handle 47 located at the distal end of the second ramp portion 48.

In a storage mode of the retractable ramp assembly 36, as shown in FIGS. 1–4 and 9, the second ramp portion 48 of the retractable ramp assembly 36 is retracted into the first ramp portion 46. Also, in the storage mode, the first ramp portion 46 is supported by both the second base portion 28 and the first base portion 26 of the framework assembly 16. Also, in the storage mode, the second ramp portion 48 is supported on both of its ends by the first ramp portion 46. More specifically, in the storage mode, the second ramp portion 48 is nested into the first ramp portion 46, and both the first ramp portion 46 and the second ramp portion 48 are nested into the framework assembly 16 and supported by the second base portion 28 and the first base portion 26 of the framework assembly 16.

Figure 6:
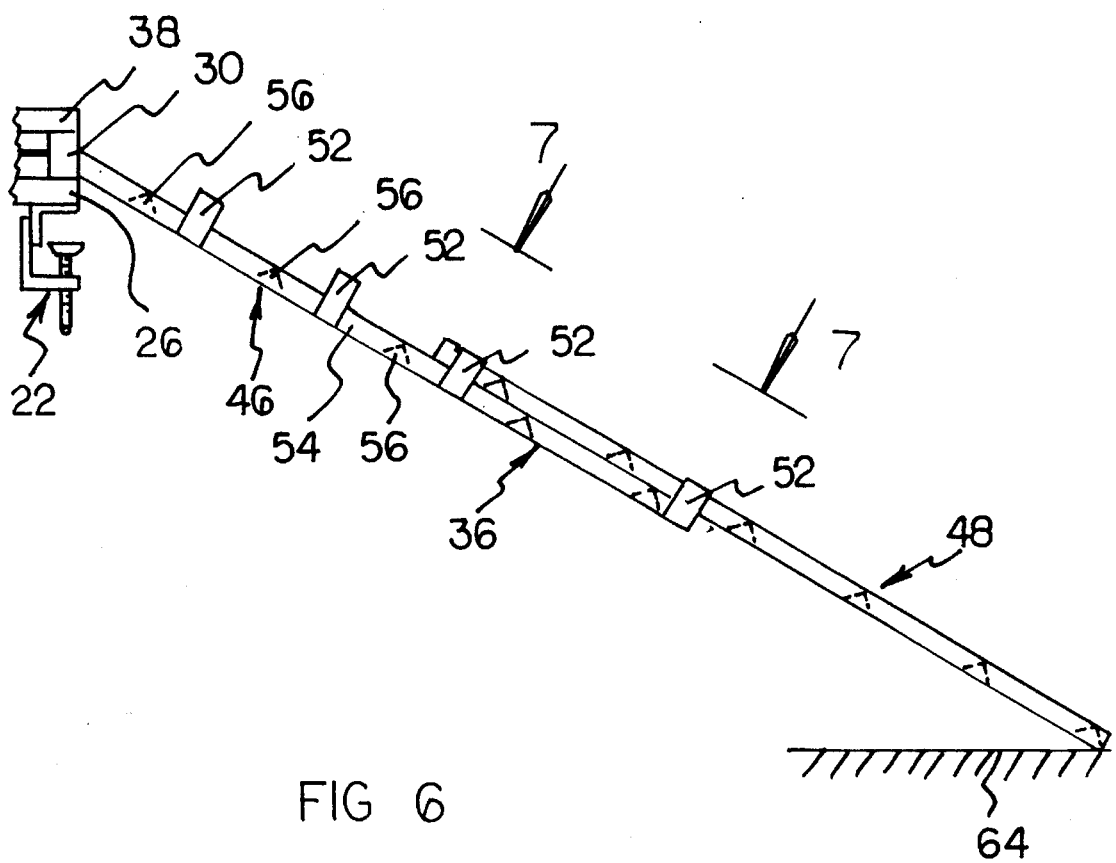
FIG. 6 is a partial rear view of the embodiment of the invention shown in FIG. 5 with the ramp assembly fully extended and in contact with the ground.
Figure 7:
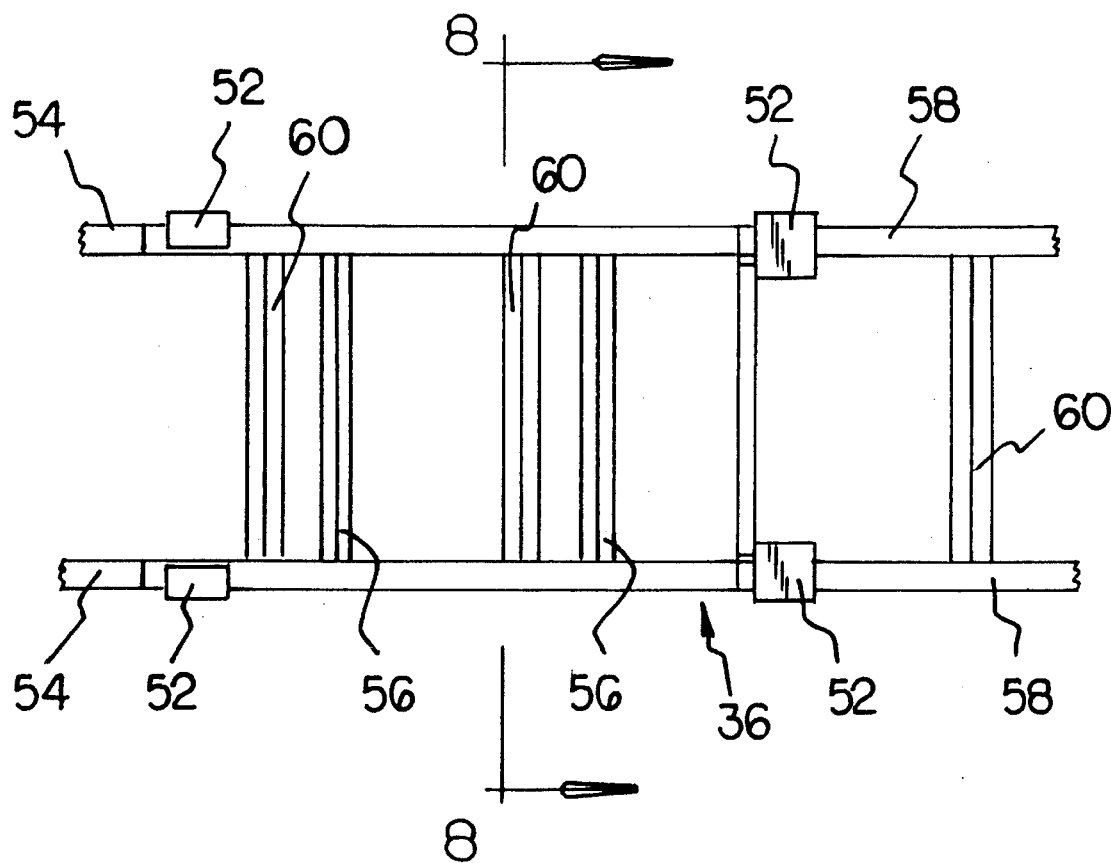
FIG. 7 is a top view of a portion of the ramp assembly shown in FIG. 6 taken along line 7—7 of FIG. 6.
Figure 8:
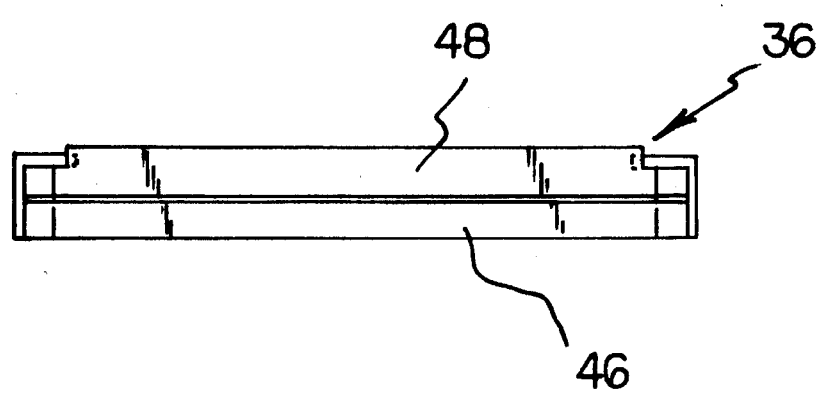
FIG. 8 is an enlarged cross-sectional view of the portion of the ramp assembly shown in FIG. 7 taken along line 8—8 of FIG. 7.

In contrast, for the retractable ramp assembly 36 to be placed in a load/unload mode, as shown in FIGS. 6–8 and 10–12, both the first ramp portion 46 and the second ramp portion 48 are adapted to be slid horizontally away from the second base portion 28 of the framework assembly 16. The first ramp portion 46 is adapted to pivot for downward movement from the first base portion 26 of the framework assembly 16, and the second ramp portion 48 is adapted to be selectively extended away from or retracted toward the first ramp portion 46. As shown in FIGS. 6, 10, and 11, the distal end of the second ramp portion 48 contacts the ground 64.

As shown in FIG. 6, the first ramp portion 46 includes a plurality of guide members 52 which contact and guide the second ramp portion 48 when the second ramp portion 48 is moved longitudinally with respect to the first ramp portion 46.

The first ramp portion 46 includes a pair of transverse members 54 and a plurality of longitudinal cross members 56 connected across the transverse members 54. The second ramp portion 48 includes a pair of transverse members 58 and a plurality of longitudinal cross members 60 connected across the transverse members 58.

As shown in FIG. 10, the first ramp portion 46 includes a pair of channels 50, and the second ramp portion 48 includes a pair of flanges 52 which are slidingly received in the channels 50.

In using either the first or the second embodiment of the vehicle carrier apparatus 10 of the invention, a pair of vehicle carrier apparatus 10 are employed to carry a small four-wheeled vehicle. For each vehicle carrier apparatus 10, the retracted retractable ramp assembly 36 is pulled out from the framework assembly 16 and pivoted downward at the first base portion 26 of the framework assembly 16. The second ramp portion 48 of each retractable ramp assembly 36 is pulled out (extended out) from the first ramp portion 46, and the distal end of the second ramp portion 48 of each retractable ramp assembly 36 is lowered to contact the ground 64. Then, a small four-wheeled vehicle, such as the all terrain vehicle 15 shown in FIG. 1, can be rolled up the pair of retractable ramp assemblies 36 and rolled onto the pair of transported-vehicle support assemblies 34.

More specifically, with the first embodiment of the invention, the cross members 40 of the transported-vehicle support assembly 34 serve to retain the all terrain vehicle 15 on the transported-vehicle support assembly 34. The cross members 40 act as small chocks which prevent rolling of the wheel 45 on the transported-vehicle support assembly 34. Also, with the first embodiment of the invention, the first ramp portion 46 has cross members 56, and the second ramp portion 48 has cross members 60. The cross members 56 and the cross members 60 also serve to prevent undesired rolling of the all terrain vehicle 15 on the retractable ramp assembly 36 when the all terrain vehicle 15 is either loaded onto the transported-vehicle support assembly 34 or unloaded off of the transported-vehicle support assembly 34. Moreover the use of the respective cross members in the transported-vehicle support assembly 34 and the first ramp portion 46 and the second ramp portion 48 of the retractable ramp assembly 36 prevent pooling or accumulation of water on the vehicle carrier apparatus 10 of the invention.

In FIGS. 9–11, the second embodiment of the invention is shown. Reference numerals are shown that correspond to like reference numerals that designate like elements shown in the other figures. In addition, the transported-vehicle support assembly 34 includes a platform member 35. The platform member 35 includes a ramp end portion 37 located at each end of the platform member 35.

The first base portion 26 of the framework assembly 16 includes a first eye assembly 74. The first ramp portion 46 of the retractable ramp assembly 36 includes a first hook assembly 76 located at a first end of the first ramp portion 46 and a second hook assembly 78 located at a second end of the first ramp portion 46. As shown in FIG. 13, when the first hook assembly 76 of the first ramp portion 46 is in engagement with the first eye assembly 74 of the framework assembly 16, the retractable ramp assembly 36 is locked into the storage position. As shown in FIG. 11, after the first hook assembly 76 has been lifted out of the first eye assembly 74, and after the first ramp portion 46 has been moved horizontally out from under the transported-vehicle support assembly 34, then the second hook assembly 78 is inserted into the first eye assembly 74 to lock the first ramp portion 46 onto the framework assembly 16 when the retractable ramp assembly 36 is in the load/unload position. The first ramp portion 46 with its second hook assembly 78 readily pivots around the framework assembly 16 with its first eye assembly 74.

The second base portion 28 of the framework assembly 16 includes a second eye assembly 80. As shown in FIG. 11, the second eye assembly 80 can also be used for pivotally supporting the retractable ramp assembly 36. In this way, the all terrain vehicle 15 can be rolled forward up the extended retractable ramp assembly 36 shown on the right side of FIG. 11 to load the all terrain vehicle 15 onto the transported-vehicle support assembly 34. To unload the all terrain vehicle 15 from the transported-vehicle support assembly 34, the all terrain vehicle 15 can be rolled forward down the retractable ramp assembly 36 that is connected to the left side of FIG. 11. Alternatively, the all terrain vehicle 15 can be unloaded from the transported-vehicle support assembly 34 by backing the all terrain vehicle 15 down the retractable ramp assembly 36 shown in place on the right side of FIG. 11.

The components of the truck-mounted, vehicle carrier apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved truck-mounted, vehicle carrier apparatus that is low in cost, relatively simple in design and operation, and which may advantageously be used to avoid the need to load and unload a small vehicle by way of a lowered tailgate on a pickup truck or other transporter vehicle. With the invention, a truck-mounted, vehicle carrier apparatus is provided which is not specifically adapted to work in conjunction with a tailgate. With the invention, a truck-mounted, vehicle carrier apparatus is provided which does not require a carried vehicle to be backed off of the transporter vehicle. With the invention, a truck-mounted, vehicle carrier apparatus is provided which carries a small vehicle on a transporter vehicle in such a way that the small vehicle need not be loaded and unloaded along the longitudinal axis of the transporter vehicle. With the invention, a truck-mounted, vehicle carrier apparatus is provided which readily drains water to prevent water accumulation. With the invention, a truck-mounted, vehicle carrier apparatus is provided which does not occupy bed space in a truck or trailer.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A vehicle carrier apparatus that is adapted to be mounted on a first side wall and a second side wall of a transporter vehicle, comprising:
    a framework assembly which includes a first end portion and a second end portion, wherein said framework assembly includes a first base portion located at said first end portion and a second base portion located at said second end portion,
    a first clamp assembly attached to said first base portion of said framework assembly, wherein said first clamp assembly is adapted to clamp onto the first side wall of the transporter vehicle,
    a second clamp assembly attached to said second base portion of said framework assembly, wherein said second clamp assembly is adapted to clamp onto the second side wall of the transporter vehicle,
    a first riser assembly connected to said first base portion of said framework assembly such that said first riser assembly is supported by the first side wall of the transporter vehicle,
    a second riser assembly connected to said second base portion of said framework assembly such that said second riser assembly is supported by the second side wall of the transporter vehicle,
    a transported-vehicle support assembly supported by said first riser assembly and said second riser assembly, and
    a retractable ramp assembly, supported by said framework assembly in a location in said framework assembly above said first base portion and said second base portion and below said transported-vehicle support assembly.

2. The apparatus of claim 1 wherein said first base portion and said second base portion of said framework assembly are connected together with a strut portion.

3. The apparatus of claim 2 wherein said first base portion, said second base portion, and said strut portion are formed as a unitary integrated structure.

4. The apparatus of claim 1 wherein said first clamp assembly and said second clamp assembly are screw clamp assemblies.

5. The apparatus of claim 1 wherein said transported-vehicle support assembly includes:
    a pair of transverse members supported by said first riser assembly and said second riser assembly, and
    a plurality of longitudinal cross members connected between said transverse members.

6. The apparatus of claim 5 wherein:
    said cross members are spaced apart from one another transversely along said transverse members by a transverse distance which separates said cross members from one another along said transverse members.

7. The apparatus of claim 1, further including:
    a fence assembly connected to said framework assembly.

8. The apparatus of claim 7 wherein said fence assembly includes:
    a pair of fence supports connected to a pair of second riser assemblies of said framework assembly, and
    a fence member connected to said fence supports.

9. The apparatus of claim 1 wherein said retractable ramp assembly includes:
    a first ramp portion supported by said first base portion and said second base portion, and
    a second ramp portion supported by said first ramp portion.

10. The apparatus of claim 9 wherein:
    both said first ramp portion and said second ramp portion are adapted to be slid horizontally away from said second base portion of said framework assembly,
    said first ramp portion is adapted to pivot for downward movement from said first base portion of said framework assembly, and
    said second ramp portion is adapted to be selectively extended away from or retracted toward said first ramp portion.

11. The apparatus of claim 9 wherein said first ramp portion includes a plurality of guide members which contact and guide said second ramp portion when said second ramp portion is moved longitudinally with respect to said first ramp portion.

12. The apparatus of claim 9 wherein:
    said first ramp portion includes a pair of transverse members and a plurality of cross members connected across said transverse members, and said second ramp portion includes a pair of transverse members and a plurality of cross members connected across said transverse members.

13. The apparatus of claim 9 wherein:

said first ramp portion includes a pair of channels, and said second ramp portion includes a pair of flanges which are slidingly received in said channels.

14. The apparatus of claim 9 wherein:

said first base portion of said framework assembly includes a first eye assembly, and said first ramp portion of said retractable ramp assembly includes a first hook assembly located at a first end of said first ramp portion and includes a second hook assembly located at a second end of said first ramp portion.

15. The apparatus of claim 14 wherein said second base portion of said framework assembly includes a second eye assembly.

16. The apparatus of claim 1 wherein said transported-vehicle support assembly includes a platform member.

17. The apparatus of claim 16 wherein said platform member includes a ramp end portion located at an end of said platform member.

18. The apparatus of claim 16 wherein said platform member includes a ramp end portion located at each end of said platform member.

* * * * *